(No Model.)
J. O. NORDENSTRÖM.
SLED.
No. 435,944. Patented Sept. 9, 1890.
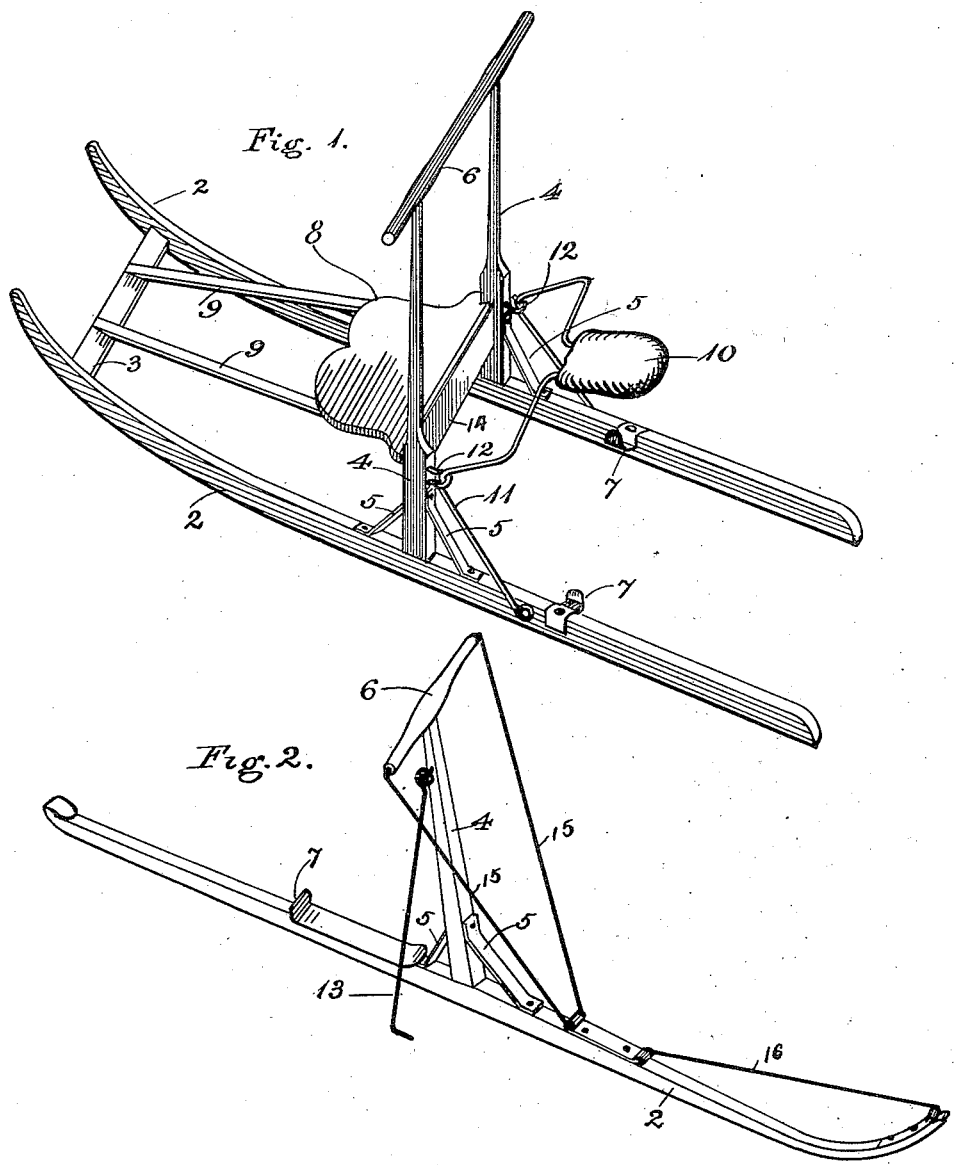
Witnesses.
Willard B. Robert
A. Mac Welch
Inventor.
John O. Nordenström,
by Paul T Merwin
Attorneys.

UNITED STATES PATENT OFFICE.

JOHAN OLAH NORDENSTRÖM, OF CAMBRIDGE, MINNESOTA, ASSIGNOR OF ONE-HALF TO PETER E. FREDEEN, OF SAME PLACE.

SLED.

SPECIFICATION forming part of Letters Patent No. 435,944, dated September 9, 1890.

Application filed March 10, 1890. Serial No. 343,236. (No model.)

*To all whom it may concern:*

Be it known that I, JOHAN OLAH NORDENSTRÖM, of Cambridge, Isanti county, Minnesota, have invented certain Improvements in Sleds, of which the following is a specification.

My invention relates to improvements in sleds adapted to be propelled by hand-power, its object being to provide an improved device with either one or two runners and having suitable attachments by means of which the same may be pushed and guided by hand; and it consists in providing a transverse cross-bar or handle supported on standards centrally placed upon the runners and foot-rests or stirrups on the runners upon which the driver of the sled can stand with one foot when propelling the sled by pushing with the other or with both feet when descending an incline where the sled is carried forward by its own gravity.

My invention further consists in the construction and combination herein described, and particularly pointed out in the claims.

In the accompanying drawings, forming part of this specification, Figure 1 is a perspective view of my improved sled, shown as constructed with two runners having a fixed seat for a passenger and an adjustable seat for the driver; and Fig. 2 is a perspective of a modified construction having but one runner.

In the drawings, 2 represents the sled-runners; 3, the cross-bar connecting them at their forward end; 4, upright standards arranged centrally upon the runners and firmly secured thereto by means of braces 5 and 6, the transverse handle or cross-bar secured to the top of said standards at a convenient height to be grasped by the hands of a person standing behind the same.

Arranged in the rear of the standards 4 upon the sled-runners are steps or stirrups 7, adapted to firmly secure the feet of the driver when standing upon the sled.

8 is a fixed seat arranged in front of the standards and having suitable supports 9, upon which a passenger or other load may be carried.

10 is a saddle supported on a bail 11, the ends of which are pivotally secured to the runners in the rear of the standards and are held from backward movement by stops or hooks 12 upon the standards engaging each side of the bail, which permits the saddle to be thrown forward against the standards and out of the way of the driver and to be returned to the normal position, as shown in Fig. 1, when needed for use as a seat for the driver.

In the modified construction shown in Fig. 2 the device is constructed, preferably, without seats, it being used merely as a means of rapid traveling for the driver only upon snow and ice in the same manner as the bycicle is used upon the ground. In this construction the device is preferably provided with a brace-rod 13, loosely secured to the standard and adapted to be swung laterally from the sled with its foot resting on the ground, thus serving to keep the sled in an upright position when not in use, and brace-rods 15 and 16 to thoroughly brace the parts together.

The sled is propelled by a person standing with one foot in a stirrup with the hands grasping the handle, the other foot stepping upon the ground and used to thrust the sled forward. With the momentum thus given to the sled or with that which it attains of its own weight in descending a hill, the driver can step both feet into the stirrups and be carried by the sled until it is necessary to again propel it, the course of the sled being easily controlled by means of the handle.

In coasting down a hill with the form of sled shown in Fig. 1 the driver can, if he desires, swing back the saddle 8 and support himself thereon while being carried by the sled instead of standing upon the stirrups.

I claim—

1. As an improved article of manufacture, a sled having upright standards arranged centrally of the runners, a transverse handle supported thereon, and stirrups arranged upon the runners in the rear of said standards, substantially as and for the purposes set forth.

2. As an improved article of manufacture, the foregoing-described device having the runners 2, the standards 4, arranged centrally thereon, a transverse handle 6, secured upon said standards, stirrups 7, arranged upon said runners in the rear of said standards, the saddle 10, pivotally supported upon said runners by means of the bail 11, and stops 12 upon said standards engaging with said bail and holding it from backward movement, substantially as and for the purposes set forth.

In testimony whereof I have hereunto set my hand this 21st day of February, 1890.

JOHAN OLAH NORDENSTRÖM.

In presence of—
GEORGE DOREMUS,
S. H. MCKUSICK.